Sept. 15, 1953 — E. C. HORTON — 2,651,801
WINDSHIELD CLEANER SYSTEM
Filed April 16, 1949
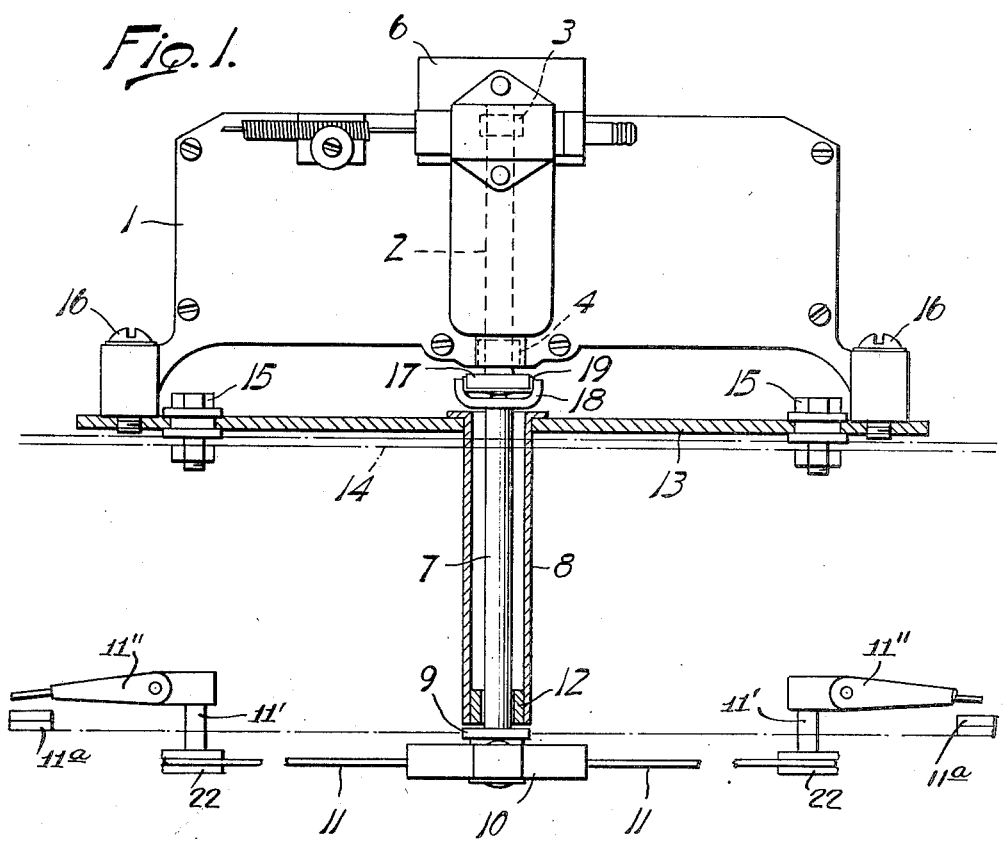
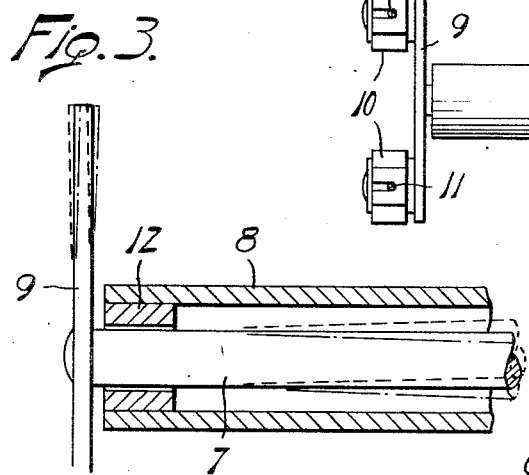
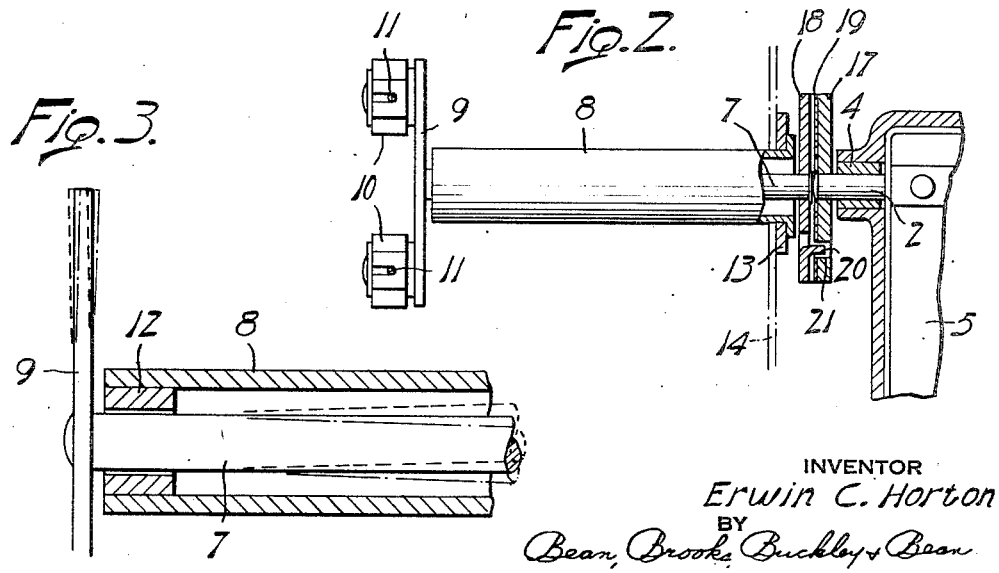
INVENTOR
Erwin C. Horton
BY
Bean, Brooks, Buckley & Bean
ATTORNEYS Patented Sept. 15, 1953

2,651,801

UNITED STATES PATENT OFFICE 2,651,801

WINDSHIELD CLEANER SYSTEM

Erwin C. Horton, Hamburg, N. Y., assignor to Trico Products Corporation, Buffalo, N. Y.

Application April 16, 1949, Serial No. 88,010

8 Claims. (Cl. 15—253)

This invention relates to the windshield cleaning art and more particularly to a power driven system, the primary aim of the invention being to facilitate the assembly or installation of the system and to prolong the factory prescribed efficiency thereof.

In the present day automobile the power unit of the windshield cleaner system has been installed on the front or engine side of the fire wall between the engine compartment and the passenger compartment, whereas the power transmission has been installed on the passenger side of the fire wall, the arrangement being such that the power unit may be dismantled or demounted independently of the transmission unit, and vice versa. In the known constructions or installations the power shaft has been axially aligned with the driven shaft forming a part of the transmission unit, each shaft having its own journal bearing support with no provision made to accommodate any off-center mounting of one shaft with respect to the other. Consequently, when the two shafts were improperly mounted a binding action resulted impairing the efficiency of the windshield cleaner as a whole.

A further object of this invention is to provide an arrangement which will accommodate any misalignment of shafts and therefore insure better performance and greater efficiency.

A further object is to provide an arrangement of this character wherein the power unit is favored over the driven shaft to insure prolonged usefulness and life of the power drive or unit.

The foregoing and other objects will manifest themselves as this description progresses, reference being had to the accompanying drawing, wherein Fig. 1 is a fragmentary view of the windshield cleaner system embodied in the present invention showing the power unit and wiper units in plan view;

Fig. 2 is a side elevation, partly in section, and showing the coupling, the power unit, and the transmission unit; and Fig. 3 is an enlarged fragmentary view depicting the lateral play in the shaft mounting.

Referring more particularly to the accompanying drawing, the power unit comprises a motor having a casing or housing 1, with a shaft 2 journaled in spaced but axially aligned bearings 3 and 4. The motor may be of any suitable type, the one herein illustrated being of the fluid pressure type and operable off from the manifold of the vehicle engine. In this type of motor the drive shaft 2 carries a paddle or piston 5 on which the fluid pressure differential is intermittently reversed by a valve mechanism within the chamber 6 for imparting oscillatory movement to the drive shaft.

The power transmission unit includes a driven shaft 7 having journal support in a bracket 8 and carrying on one end a rocker arm 9 extending in opposite directions and pivotally supporting upper and lower connectors 10 to which the opposite ends of the cables 11 are connected. The cables extend over to the wiper shafts 11' which are each arranged usually at the lower side of the windshield for oscillating the wiper 11a and its actuating arm, generally indicated at 11" back and forth over the windshield surface. Such an arrangement is generally shown in the earlier Patent No. 2,547,285 wherein the power unit and the transmission unit are mounted at the opposite sides of the fire wall and detachably connected. When the parts are properly related, the drive and driven shafts perform very efficiently. However, in the assembly line of the modern mass production a possible off-center mounting of the two shafts resulted in an impaired efficiency.

In accordance with the present invention means are provided to accommodate any such off-center relationship and thereby to insure efficient performance of the windshield cleaner installation. To this end, and in accordance with the illustrated embodiment, one of the shafts is given a semi-floating mounting which will permit a limited lateral play of the shaft as it may be guided by or from the fixedly journaled companion shaft. In the illustration the driven shaft 7 is given this semi-floating support and this is accomplished herein by having the outer end of the shaft journaled in a bushing or bearing 12 in the bracket support 8. The opposite end of the shaft, or that end adjacent the power shaft 2, receives its primary support from the power shaft and is otherwise not directly supported. The bracket support is in the form of a sleeve 8 fixed to a mounting plate or member 13 which in turn is anchored on the fire wall 14 by suitable fasteners 15. This mounting plate also serves as a support for the motor 1, being connected thereto by the screw bolts 16. The bushing 12 is fixed in the outer end of the mounting sleeve 8, while the opposite end of the driven shaft 7 is given ample clearance with respect to the inner wall of the sleeve to shift or play laterally from a point of fulcrum support within the bushing 12. Therefore, the bushing will have a slight clearance of one or two thousandths of an inch, which is greatly exaggerated in Fig. 1, by way of example. By reason of this clearance the adjacent end of the driven shaft will follow any eccentricity of the driving shaft resulting from an accidental off-center displacement between the two shafts.

The two shafts are detachably coupled together by suitable means such as that illustrated in Figs. 1 and 2 wherein the driving shaft is provided with a cross head 17 designed to be received in a channeled driven head 18 fixed to the adjacent end of the driven shaft, with or without an interposed silencing pad or cushioning element 19 interposed therebetween. Upon tightening the screws 16 the coupler parts will be drawn into firm driving interlocking engagement. Now, should the shafts be misalined so that the channeled head 18 is inclined to either side, as viewed in Fig. 1, the crosshead 17 will have its opposite margins working in and out of the channel when the shaft 2 is rotated while still maintaining the driving interlock. This in effect provides a rockable, driving connection between the two shafts which enables ready demounting of either. To avoid any substantial radial sliding of the driving head 17 within the channel 18 of the driven coupler part, should there be any eccentricity or off-center displacement between the two shafts, an interlock may be provided between the coupler parts, such as a lug 20 on one part engaging in a recess or opening 21 in the companion part. Such interlock will insure full and proper support of the driven shaft by the driving shaft at such floating end of the former.

By reason of the foregoing construction, either unit may be readily installed or replaced and assurance be had that both units will operate and perform efficiently and in a proper mechanical manner.

The floating action of the adjacent end of the driven shaft is confined within practical limits by the encircling end of the mounting sleeve 8. The bracket support for the journal bushing 12 is depicted in sleeve form, but may assume other bracket shapes.

While the foregoing description has been given in detail, it is without thought of limitation since the inventive principles involved are capable of assuming other physical embodiments without departing from the spirit of the invention and the scope of the appended claims.

What is claimed is:

1. A windshield cleaning system having a power unit, a wiper, a wiper actuating transmission unit, the power unit having a drive shaft, the transmission unit having a driven shaft with wiper actuating means connected to the latter, the two shafts being arranged end to end, means providing a fixed journal support for the adjacent end of one shaft about a fixed axis, a support for the remote end only of the companion shaft providing a loose journal bearing by which the unsupported adjacent end of said companion shaft may be brought substantially in axial alignment with the one shaft, and means coupling the adjacent ends of the shafts for torque transmission and for the lateral support of the adjacent end of the companion shaft.

2. A windshield cleaning system having a power unit, a wiper, a wiper actuating transmission unit, the power unit having a drive shaft, the transmission unit having a driven shaft with a wiper actuating crank on one end, the two shafts being arranged end to end, means providing journal support for the adjacent end of the drive shaft about a fixed axis, a fixed support for the crank one end of the driven shaft providing a loose journal bearing therefor and enabling its adjacent end being moved laterally into axial alignment with the drive shaft, and a detachable coupling joining the adjacent ends of the two shafts for constituting a driving connection therebetween and to afford lateral support for the adjacent end of the driven shaft.

3. A windshield cleaning system having a power unit, a wiper, a wiper actuating transmission unit, the power unit having a drive shaft, the transmission unit having a driven shaft with a wiper actuating crank on one end, the two shafts being arranged end to end, means providing journal support for the adjacent end of the drive shaft about a fixed axis, a support for the crank end of the driven shaft providing a loose journal bearing therefor and enabling its adjacent end being moved laterally into axial alignment with the drive shaft, and means detachably coupling the adjacent ends of the shafts together and including a cross head on one shaft removably engaging in a recess in the other shaft for providing floating support for the adjacent end of the driven shaft within limited restrictions.

4. A windshield cleaning system having a power unit, a wiper, a wiper actuating transmission unit, the power unit having a drive shaft, the transmission unit having a driven shaft with a wiper actuating crank on one end, the two shafts being arranged end to end, means providing journal support for the adjacent end of the drive shaft about a fixed axis, a support for the crank end of the driven shaft providing a loose journal bearing therefor and enabling its adjacent end being moved laterally into axial alignment with the drive shaft, said support confining the adjacent end of the driven shaft for limited lateral movement relative to said loose journal bearing, and means coupling the adjacent ends of the shafts together for the transmission of rotary movement.

5. A windshield cleaning system having a power unit, a wiper, a wiper actuating transmission unit, the power unit having a drive shaft, the transmission unit having a driven shaft with a wiper actuating crank on one end, the two shafts being arranged end to end, means providing journal support for the adjacent end of the drive shaft about a fixed axis, a fixed support for the crank end of the driven shaft providing a loose journal bearing therefor and enabling its adjacent end being moved laterally into axial alignment with drive shaft, said support confining the adjacent end of the driven shaft for limited lateral swinging movement relative to said fixed support, said loose journal bearing accommodating such limited swinging movement of the driven shaft, and means coupling the adjacent ends of the shafts together for the transmission of power.

6. A windshield cleaning system having a power unit, a wiper, and wiper actuating means including a transmission unit, each unit having a shaft, the two shafts being arranged end to end, means providing journal support for one shaft about a fixed axis, a support for the remote end of the companion shaft providing a journal bearing for the latter substantially in axial alignment with the one shaft, said journal bearing accommodating a limited swinging movement of the companion shaft for assuming a position in axial alignment with said one shaft, and means coupling the adjacent ends of the shafts together for the transmission of power, said coupling means affording support for the adjacent end of the companion shaft from said one shaft.

7. A windshield cleaning system having a power unit, a wiper, a wiper actuating transmission unit, the power unit having a drive shaft, the transmission unit having a driven shaft with wiper actuating means connected to the latter, the two shafts being arranged end to end, means providing journal support for the adjacent end of one shaft about a fixed axis, a support for the remote end only of the companion shaft providing a loose journal bearing by which the unsupported adjacent end of said companion shaft may be moved laterally relative thereto and brought substantially in axial alignment with the one shaft, and a coupler joining the adjacent ends of the two shafts for torque transmission, said coupler comprising a cross head fixed to the adjacent end of each shaft, with one cross head being formed with a socket rockably receiving the companion cross head interlockingly upon axial movement of the shafts toward each other.

8. A windshield cleaning system having a power unit, a wiper, a wiper actuating transmission unit, the power unit having a drive shaft, the transmission unit having a driven shaft with wiper actuating means connected to the latter, the two shafts being arranged end to end, means providing journal support for the adjacent end of one shaft about a fixed axis, a support for the remote end only of the companion shaft providing a loose journal bearing by which the unsupported adjacent end of said companion shaft may be brought substantially in axial alignment with the one shaft, and a coupler joining the adjacent ends of the two shafts for torque transmission, said coupler comprising a crosshead fixed to the adjacent end of each shaft, with one crosshead being formed with a channel for interlockingly receiving the companion cross head upon relative axial movement of the two shafts between and toward each other, one of the cross heads having a recess and the other cross head having a lug engaged in the recess to prevent radial displacement of one crosshead from the other.

ERWIN C. HORTON.

References Cited in the file of this patent

UNITED STATES PATENTS

| Number | Name | Date |
|---|---|---|
| 2,172,488 | Waters | Sept. 12, 1939 |
| 2,297,400 | Friedrich | Sept. 29, 1942 |